(12) United States Patent
Chen et al.

(10) Patent No.: US 8,974,103 B2
(45) Date of Patent: Mar. 10, 2015

(54) LIGHT-EMITTING DEVICE WITH VIGNETTING EFFECT

(71) Applicant: Wistron Corporation, New Taipei (TW)

(72) Inventors: Kuang-Wen Chen, New Taipei (TW); Yu-Hsin Huang, New Taipei (TW); Fu-Chien Chen, New Taipei (TW); Chun-Chiang Lai, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 111 days.

(21) Appl. No.: 13/951,425

(22) Filed: Jul. 25, 2013

(65) Prior Publication Data
US 2014/0119045 A1    May 1, 2014

(30) Foreign Application Priority Data
Oct. 29, 2012   (TW) .............................. 101139981 A

(51) Int. Cl.
| F21V 7/04 | (2006.01) |
| H01L 33/00 | (2010.01) |
| F21V 8/00 | (2006.01) |
| F21V 33/00 | (2006.01) |
| G09G 3/20 | (2006.01) |
| H04N 5/64 | (2006.01) |

(52) U.S. Cl.
CPC .......... *G02B 6/0096* (2013.01); *F21V 33/0052* (2013.01); *G02B 6/0008* (2013.01); *G09G 3/2092* (2013.01); *H04N 5/64* (2013.01)
USPC ........... 362/555; 362/458; 362/561; 362/565; 362/581

(58) Field of Classification Search
CPC ...................................................... G02B 6/0096
USPC .......... 362/458, 551, 555, 559, 561, 565, 581
See application file for complete search history.

(56) References Cited

U.S. PATENT DOCUMENTS 6,755,561 B2 *   6/2004   Kluser ......................... 362/551

* cited by examiner

*Primary Examiner* — Jason Moon Han
(74) *Attorney, Agent, or Firm* — Winston Hsu; Scott Margo

(57) ABSTRACT

A light-emitting device includes a light source, a panel and a light guiding structure. The light guiding structure includes a first light guiding tunnel and a second light guiding tunnel. The first light guiding tunnel includes a first end and a second end. A first opening is formed at the first end and close to the light source. The second light guiding tunnel includes a first end and a second end. The first end of the second light guiding tunnel communicates with the second end of the first light guiding tunnel. A diameter of the second end of the second light guiding tunnel is greater than a diameter of the first end of the second light guiding tunnel. A second opening is formed at the second end of the second light guiding tunnel. A diameter of the second opening is greater than a diameter of the first opening.

15 Claims, 5 Drawing Sheets

US 8,974,103 B2

LIGHT-EMITTING DEVICE WITH VIGNETTING EFFECT

BACKGROUND OF THE INVENTION

1. Field of the Invention

The present invention relates to a light-emitting device, and more specifically, to a light-emitting device capable of shading a contour of a light source and generating a vignetting effect by a structural design.

2. Description of the Prior Art

In popular display devices, such as an All-In-One PC, a liquid crystal display (LCD) monitor and a LCD TV, a functional indicator is often implemented by a light-emitting diode. Because the appearance of the conventional electronic device tends to be simple, the functional indicator is often implemented by shading a contour of a light source. A guiding column is used to sheathe the functional indicator on the light-emitting diode, and the light source is shaded by painting or plating around an opening of the light source, so as to shade the contour of the light source. However, it increases the manufacturing cost and spends much time in postprocessing, resulting in a poor yield rate. In addition, the light-emitting diode only needs a small driving current, and brightness of the light-emitting diode driven by the small driving current is very strong. A conventional method for adjusting the brightness of the light source is using a variable resistor, but an adjustable range of the brightness by the conventional method is limited, so that the light-emitting diode makes a user feel uncomfortable due to the strong brightness as the user sees the functional indicator. As a result, it is an important issue to design a light-emitting device which can not only shade the contour of the light source but also provide a comfortable brightness of the light source without additional manufacturing cost.

SUMMARY OF THE INVENTION

The present invention is to provide a light-emitting device capable of shading a contour of a light source and generating a vignetting effect by a structural design to solve above problems.

In order to achieve above purposes, the present invention discloses a light-emitting device including a light source, a panel and a light guiding structure. The light source is for emitting light. The panel comprises a first surface and a second surface opposite to the first surface, and the light source is close to the second surface. The light guiding structure is disposed inside the panel for guiding the light derived from the light source. The light guiding structure includes a first light guiding tunnel and a second light guiding tunnel. A first end and a second end are formed on the first light guiding tunnel, a first opening is formed at the first end, and the first opening is on the second surface and close to the light source. A first end and a second end are formed on the second light guiding tunnel, the first end of the second light guiding tunnel is communicated with the second end of the first light guiding tunnel, a diameter of the second end of the second light guiding tunnel is greater than a diameter of the first end of the second light guiding tunnel, a second opening is formed at the second end of the second light guiding tunnel, the second opening is on the first surface of the panel, and a diameter of the second opening is greater than a diameter of the first opening. The light from the light source passes through the first opening, the first light guiding tunnel, the second light guiding tunnel and the second opening to emit outside the second opening in sequence, so that at least one first light area is formed by parallel direct light derived from the light and located on a central position of the second opening on the first surface of the panel, and other light areas are formed by non-parallel direct light derived from the light and surround the first light area.

According to the disclosure, the other light areas surrounding the first light area comprises a second light area mainly formed by oblique light derived from the light source.

According to the disclosure, the other light areas surrounding the second light area comprises a third light area mainly formed by scattering light derived from the light source.

According to the disclosure, the light source is a circular light source, and a diameter of the first end of the first light guiding tunnel is substantially equal to a diameter of the second end of the first light guiding tunnel.

According to the disclosure, the diameter of the first opening is substantially equal to an outer diameter of the light source.

According to the disclosure, the light-emitting device further includes a decoration plate disposed on the first surface of the panel, and the decoration plate is selectively for shading the light source as the light source does not emit the light or for allowing light derived from the light source passing through.

According to the disclosure, the decoration plate comprises an opaque layer disposed on a side facing the first surface of the panel, and the opaque layer is for blocking the light derived from the light source.

According to the disclosure, the decoration plate further comprises a transparent layer disposed on the other side away from the first surface of the panel.

According to the disclosure, the transparent layer of the decoration plate comprises a polished surface.

According to the disclosure, the decoration plate further comprises a mesh layer disposed between the opaque layer and the transparent layer.

According to the disclosure, a guiding hole corresponding to the second opening is formed on the opaque layer and the mesh layer, and a diameter of the guiding hole is not greater than the diameter of the second opening.

According to the disclosure, the decoration plate further comprises a translucent layer disposed inside the guiding hole corresponding to the mesh layer, and the translucent layer is for blocking the light derived from the light source partially, so as to generate a nebulization effect.

According to the disclosure, the light source is a light-emitting diode.

According to the disclosure, the light-emitting device further includes a circuit board whereon the light source is disposed, and the circuit board is close to the second surface of the panel.

According to the disclosure, the light-emitting device further includes a touch sensing component disposed on the circuit board and close to the light source.

The present invention provides the light-emitting device with vignetting effect. The light derived from the light source can be divided into the parallel direct light, the oblique light and the scattering light by the first light guiding tunnel and the second light guiding tunnel formed in the light guiding structure, so as to generate the vignetting effect. Furthermore, it can reduce the brightness of the light emitting outside the light-emitting device to comfort the user's eyes by the opaque layer of the decoration plate. In addition, it can design that the diameter of the guiding hole is less than the diameter of the second opening of the second light guiding tunnel or additionally dispose the translucent layer to shade the contour of the light source. Therefore, the present invention improves a disadvantage of high cost and a poor yield rate because it has to shade the light source by means of the light guiding column, painting or plating shading material in the prior art. In addition, the present invention provides a freedom to design the light-emitting device with a beautiful appearance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
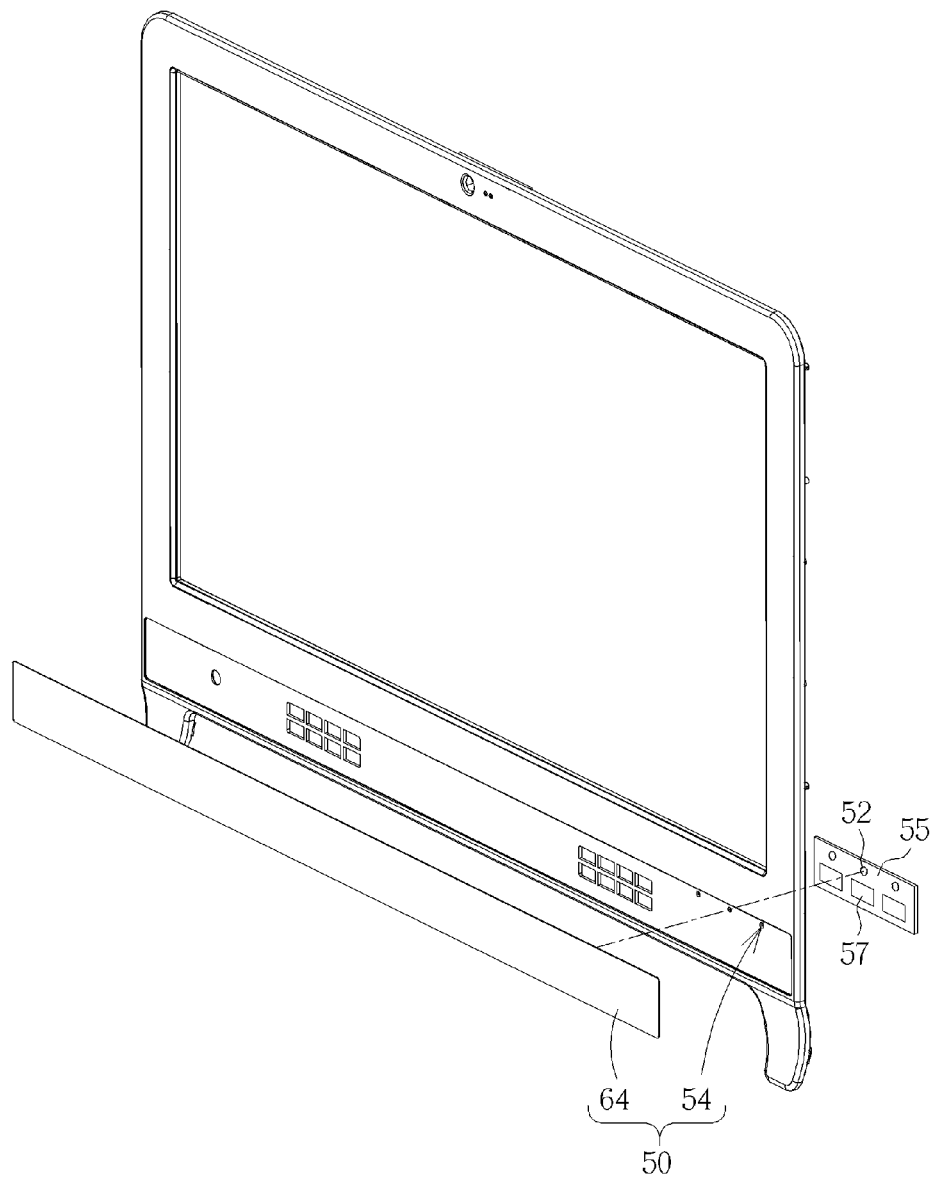
FIG. 1 is diagram of a light-emitting device installed on an electronic device according to an embodiment of the present invention.
Figure 2:
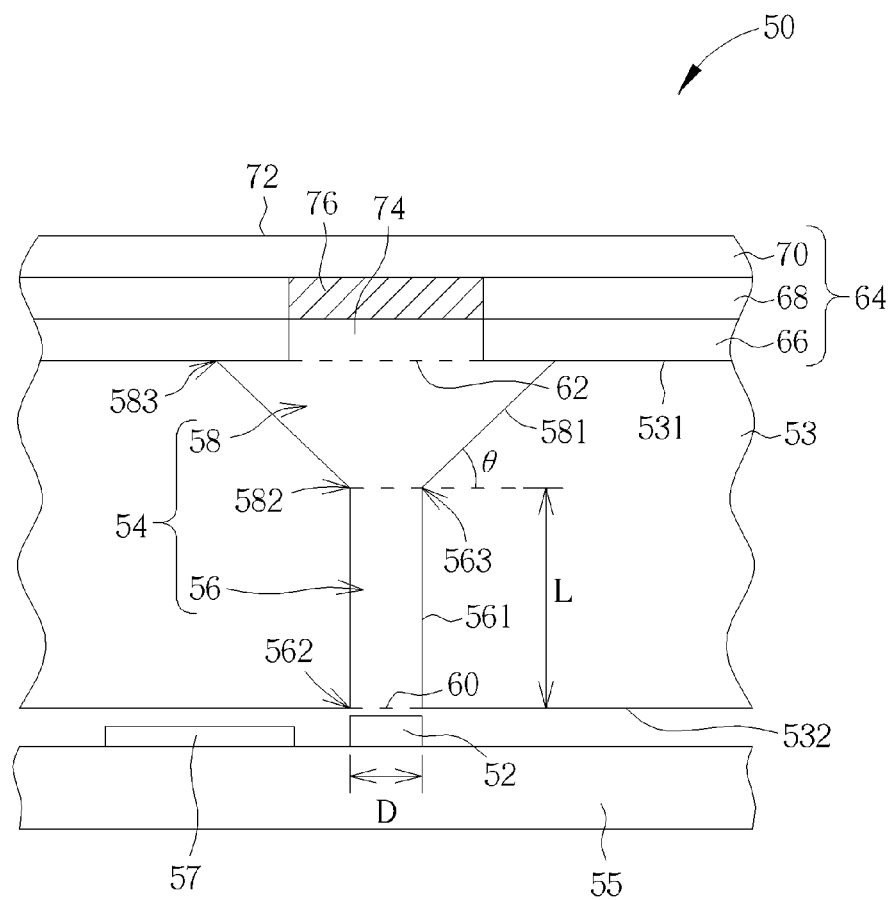
FIG. 2 is a sectional view of the light-emitting device according to the embodiment of the present invention.

Please refer to FIG. 1 and FIG. 2. FIG. 1 is diagram of a light-emitting device 50 installed on an electronic device according to an embodiment of the present invention. FIG. 2 is a sectional view of the light-emitting device 50 according to the embodiment of the present invention. The light-emitting device 50 can be a functional indicator installed on an All-In-One PC, a liquid crystal display (LCD) device, a LCD TV, and so on. The light-emitting device 50 includes a light source 52, a panel 53 and a light guiding structure 54. The light source 52 is for emitting light and can be a light-emitting diode installed on a circuit board 55. The light-emitting device 50 can further include a touch sensing component 57 disposed on the circuit board 55 and close to the light source 52. The touch sensing component 57 can be a capacitive-type or a resistive-type sensing component. The panel 53 can be a front bezel of the electronic device and can be made of opaque material. The panel 53 includes a first surface 531 which faces outward and a second surface 532 which faces inward, and the light source 52 is close to the second surface 532. The second surface 532 is opposite to the first surface 531. The circuit board 55 is close to the second surface 532 of the panel 53. As the touch sensing component 57 is installed on the circuit board 55, a user can touch a position on the first surface 531 of the panel 53 corresponding to the touch sensing component 57, so as to activate the touch sensing component 57 to output a corresponding signal for adjusting brightness and color shown by the neighbor light source 52.

The light guiding structure 54 is disposed inside the panel 53 corresponding to the light source 52 and for guiding the light derived from the light source 52. The light guiding structure 54 includes a first light guiding tunnel 56 and a second light guiding tunnel 58, and the first light guiding tunnel 56 and the second light guiding tunnel 58 are communicated with each other. In this embodiment, the light source 52 can be a circular light source, and the first light guiding tunnel 56 can be a cylindrical tunnel correspondingly. Shapes and amounts of the light source 52 and the first light guiding tunnel 56 are not limited to the embodiment. Moreover, a first end 562 and a second end 563 are formed on the first light guiding tunnel 56, and a first opening 60 is formed at the first end 562. A diameter of the first end 562 of the first light guiding tunnel 56 can be substantially equal to a diameter of the second end 563 of the first light guiding tunnel 56. The first opening 60 is on the second surface 532 and close to the light source 52. A diameter of the first opening 60 can be substantially equal to an outer diameter D of the light source 52, so that all of the light derived from the light source can pass through the first opening 60. However, in another embodiment, the first light guiding tunnel 56 also cannot be a cylindrical-shaped structure. That is, the diameter of the second end 563 of the first light guiding tunnel 56 is slightly greater than the diameter of the first end 562 of the first light guiding tunnel 56, or the diameter of the first end 562 of the first light guiding tunnel 56 is slightly greater than the diameter of the second end 563 of the first light guiding tunnel 56. In the previous embodiment, as the first light guiding tunnel 56 is the cylindrical-shaped structure, an inner wall 561 of the first light guiding tunnel 56 vertically runs through the panel 53 substantially, so that the light derived from the light source 52 can mostly pass through the first light guiding tunnel 56 in parallel and does not be blocked by the inner wall 561 of the first light guiding tunnel 56. That is, most of the light derived from the light source 52 is parallel direct light instead of diffusing light.

A first end 582 and a second end 583 are formed on the second light guiding tunnel 58, and the first end 582 of the second light guiding tunnel 58 is communicated with the second end 563 of the first light guiding tunnel 56. As shown in FIG. 2, an inner wall 581 of the second light guiding tunnel 58 extends to and penetrates through the first surface 531 in a direction away from the first light guiding tunnel 56 and facing the first surface 531 of the panel 52, so that a second opening 62 is formed on the second end 583 of the second light guiding tunnel 58, and the second opening 62 is on the first surface 531 of the panel 53. A diameter of the second opening 62 is greater than the diameter of the first opening 60. That is, a diameter of the second end 583 of the second light guiding tunnel 58 is greater than a diameter of the first end 582 of the second light guiding tunnel 58, and the second light guiding tunnel 58 is trumpet-shaped. As the first light guiding tunnel 56 is the cylindrical-shaped structure in the previous embodiment, a difference between the first end 582 and the second end 583 of the second light guiding tunnel 58 is greater than a difference between the first end 562 and the second end 563 of the first light guiding tunnel 56. In this embodiment, as shown in FIG. 2, a funnel-shaped light tunnel is formed by the first light guiding tunnel 56 and the second light guiding tunnel 58 cooperatively. The light from the light source 52 passes through the first opening 60, the first light guiding tunnel 56, the second light guiding tunnel 58 and the second opening 62 in sequence.

The light-emitting device 50 of the present invention further includes a decoration plate 64 disposed on the first surface 531 of the panel 53, and the decoration plate 64 is selectively for shading the light source 52 as the light source 52 does not emit the light or for allowing light derived from the light source 52 passing through. The decoration plate 64 includes an opaque layer 66 disposed on a side facing the first surface 531 of the panel 53. That is, the opaque layer 66 is disposed over the second opening 62 shown in FIG. 2. The opaque layer 66 is for blocking the light derived from the light source 52. The decoration plate 64 further includes a mesh layer 68 and a transparent layer 70. In this embodiment, the mesh layer 68 is disposed on the opaque layer 66, and the transparent layer 70 is disposed on the mesh layer 68. That is, the transparent layer 70 is disposed on a side away from the first surface 531 of the panel 53 and the light source 52. Therefore, the mesh layer 68 is disposed between the opaque layer 66 and the transparent layer 70. In this embodiment, the mesh layer 68 can be a black or dark porous plate. The transparent layer 70 includes a polished surface 72 for reflecting light derived from outer light sources to the decoration plate 64 mostly, so that the decoration plate 64 presents the beautiful appearance.

In addition, a guiding hole 74 corresponding to the second opening 62 is formed on the opaque layer 66 and the mesh layer 68, and a diameter of the guiding hole 74 is not greater than the diameter of the second opening 62. In this embodiment, the diameter of the guiding hole 74 is less than the diameter of the second opening 62. The decoration plate 64 can selectively include a translucent layer 76 disposed inside the guiding hole 74 corresponding to the mesh layer 68, and the translucent layer 76 is for blocking the light derived from the light source 52 partially, so as to generate a nebulization effect. The translucent layer 76 can be made of translucent paint, and transmittance of the translucent layer 76 can depend on proportion of toner doped in the translucent layer 76, so as to meet practical design demands. For example, the proportion of the toner doped in the translucent layer 76 can be increased to reduce the transmittance. In this embodiment, as the light source 52 does not emit the light, the user cannot see a complete contour of the light source 52 inside the light-emitting device 50 due to a configuration of the decoration plate 64. That is, the user cannot see the first light guiding tunnel 56 and the second light guiding tunnel 58 of the light guiding structure 54 and the light source 52 from the outside due to the translucent layer 76.

Figure 3:
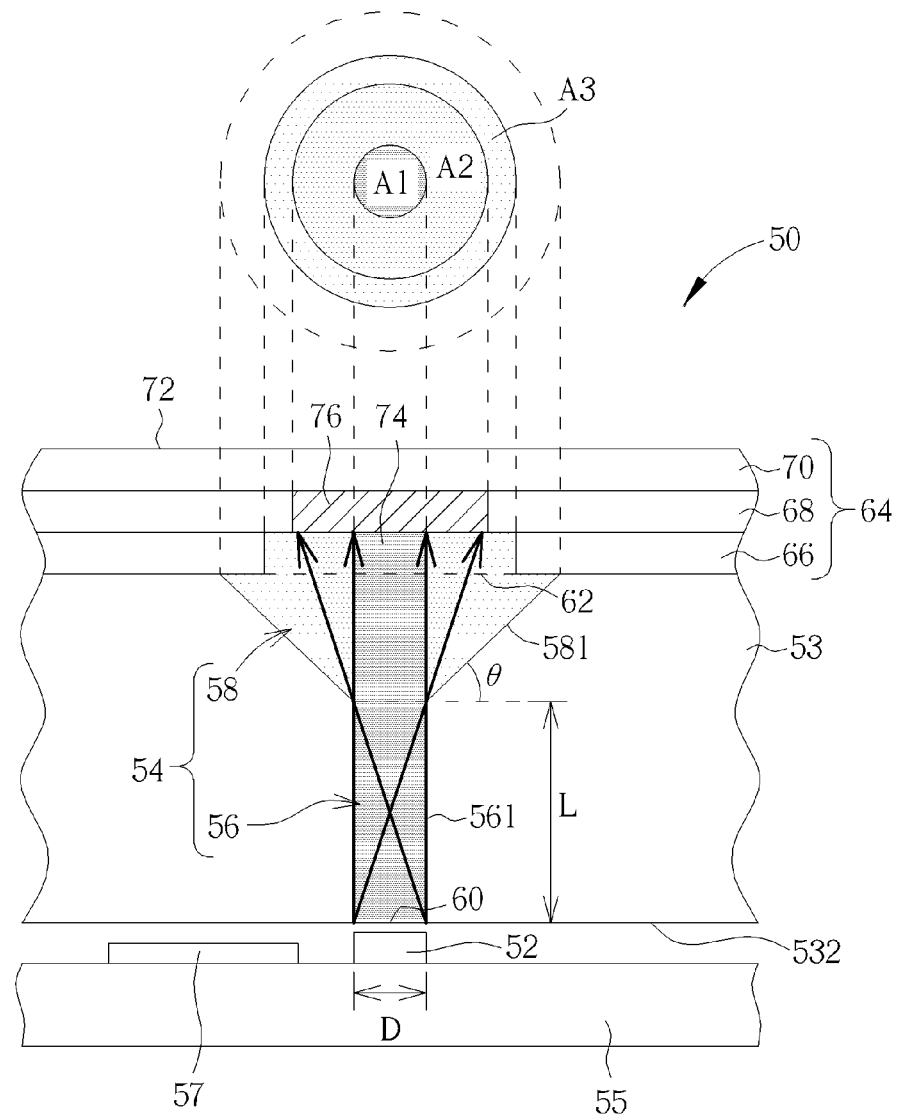
FIG. 3 is a diagram illustrating a light path of the light derived from a light source of the light-emitting device according to the embodiment of the present invention.

Please refer to FIG. 3. FIG. 3 is a diagram illustrating a light path of the light derived from the light source 52 of the light-emitting device 50 according to the embodiment of the present invention. The parallel direct light derived from the light source 52 relative to the first light guiding tunnel 56 can pass the first opening 60, the first light guiding tunnel 56, the second light guiding tunnel 58 and the second opening 62 to reach the translucent layer 76, so as to form a first light area A1. The first light area A1 is mainly formed by the parallel direct light derived from the light source 52, and the first light area A1 is located on a central position of the second opening 62 on the first surface 531 of the panel 53. A second light area A2 surrounding the first light area A1 is mainly formed by oblique light derived from the light source 52. The oblique light can pass through the second light guiding tunnel 58 and the second opening 62 without any reflection to reach the translucent layer 76. Because the second light area A2 is formed by the oblique light derived from the light source 52, brightness of the second light area A2 is weaker than brightness of the first light area A1. Finally, in the second light guiding tunnel 58 and the guiding hole 74, a third light area A3 is formed outside the first light area A1 and the second light area A2. The third light area A3 is mainly formed by the light derived from the light source 52, wherein the light scatters and reflects in the light guiding structure 54. Brightness of the third light area A3 is weaker than the brightness of the second light area A2. That is, the strong brightness to the weak brightness is in order of the first light area A1, the second light area A2 and the third light area A3.

Furthermore, a range of the first light area A1 can be determined by the outer diameter D of the light source 52 and the diameter of the first light guiding tunnel 56. A range of the second light area A2 can be determined by the diameter and a length of the first light guiding tunnel 56. A range of the third light area A3 can be determined by an angle θ formed by the second light guiding tunnel 58 and the first light guiding tunnel 56, and the angle θ depends on practical design demands. For example, a proportion of the first light area A1 to all of the light areas can be adjusted correspondingly by changing the outer diameter D of the light source 52 and the diameter of the first opening 60. For instance, the first light area A1 is enlarged by increasing the outer diameter D of the light source 52 and the diameter of the first opening 60. That is, the proportion of the first light area A1 to the second light area A2 and the third light area A3 increases. As a result, a light shape derived from the light-emitting device 50 is brighter, and vignetting effect is not obvious. On the contrary, the first light area A1 is reduced by decreasing the outer diameter D of the light source 52 and the diameter of the first opening 60. That is, the proportion of the first light area A1 to the second light area A2 and the third light area A3 is decreased. As a result, the light shape derived from the light-emitting device 50 is darker, and the vignetting effect is obvious.

In addition, a proportion of the second light area A2 to all of the light areas can be adjusted correspondingly by changing a length L of the first light guiding tunnel 56. For example, as the length L of the first light guiding tunnel 56 increases and the diameter of the first light guiding tunnel 56 keeps the same, the second light area A2 is reduced. On the contrary, as the length L of the first light guiding tunnel 56 decreases and the diameter of the first light guiding tunnel 56 keeps the same, the second light area A2 is enlarged. Furthermore, a proportion of the third light area A3 to all of the light areas can be adjusted correspondingly by changing the angle θ. As the angle θ increases, the third light area A3 is reduced. As a result, the light shape derived from the light-emitting device 50 is brighter, and the vignetting effect is not obvious. On the contrary, as the angle θ decreases, the third light area A3 is enlarged. As a result, the light shape derived from the light-emitting device 50 is darker, and the vignetting effect is obvious. In conclusion, the proportion of each light area can be determined by adjusting the length L, the angle θ, the diameter of the first light guiding tunnel 56, and the diameter of the second light guiding tunnel 58, and it can depend on practical design demands.

Moreover, the light of the first light area A1 and the second light area A2 entering the guiding hole 74 enters the translucent layer 76 and passes through the transparent layer 70, and then emits outside the decoration plate 64. Because the translucent layer 76 blocks the light partially, brightness of the light emitting outside the decoration plate 64 is weak and generates a softening effect. In addition, because the diameter of the guiding hole 74 is less than the diameter of the second opening 62, partial light of the third light area A3 emits outside the guiding hole 74. The other light is blocked by the opaque layer 66, so that partial light derived from peripheral of the light source 52 and passing through the light guiding structure 54 can not emit outside the decoration plate 64. The brightness from the first light area A1 to the third light area A3 is decreased gradually from the inside out by a structural design described above. That is, amount of the light emitting outside the light guiding structure 54 is also decreased from the inside out, so that the user can see the contour of the light source 52 with the vignetting effect and the softening effect. The vignetting effect and the softening effect are gradient visual effects instead of discontinuous visual effects, so that it can achieve a purpose of shading the contour of the light source 52.

Figure 4:
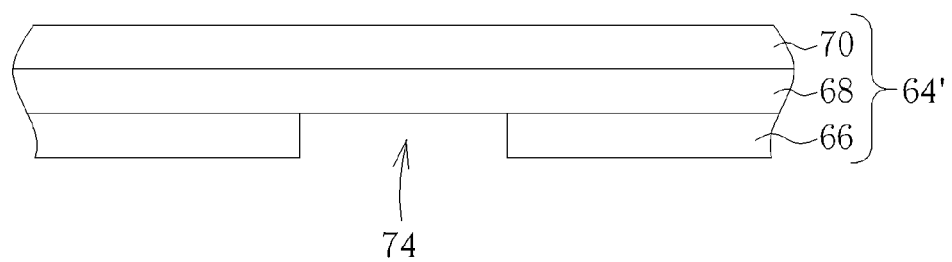
FIG. 4 is a diagram of a decoration plate according to another embodiment of the present invention.

Please refer to FIG. 4. FIG. 4 is a diagram of a decoration plate 64' according to another embodiment of the present invention. A difference between this embodiment and the previous embodiment is that the mesh layer 68 of the decoration plate 64' can have a function of blocking the light partially in this embodiment. For example, the mesh layer 68 can be a white or a light color decoration plate. Because the white or the light color decoration plate can block the light partially, it can shade the contour of the light source 52 instead of disposing the translucent layer 76 inside the guiding hole 74 in the previous embodiment. That is, the translucent layer 76 can be disposed selectively.

Figure 5:
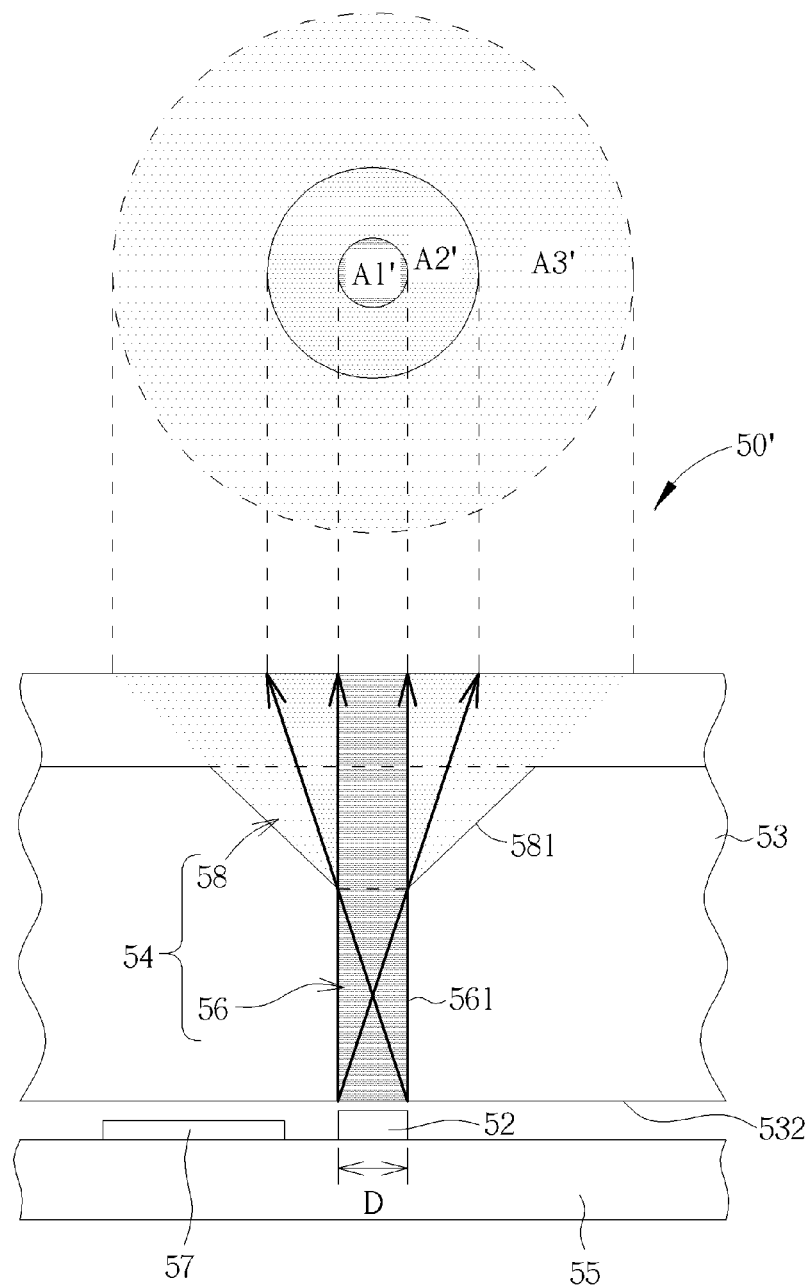
FIG. 5 is a sectional view of a light-emitting device according to another embodiment of the present invention.

Moreover, as it is only desired to generate the vignetting effect without shading the contour of the light source 52, that is, it does not need to shade the contour of the light source 52 and only needs to soften and halo the light by the light guiding structure 54 as the light source 52 does not emit the light, disposal of the decoration plate 64 can be omitted. Please refer to FIG. 5. FIG. 5 is a sectional view of a light-emitting device 50' according to another embodiment of the present invention. The light-emitting device 50' in this embodiment adopts a structural design of the light-emitting device 50 shown in FIG. 3 without the decoration plate 64. An operation principle in this embodiment is the same as an operation principle in the previous embodiment, so that the light derived from the light source 52 can be divided into the first light area A1', the second light area A2' and the third light area A3' by the light guiding structure 54 of the light-emitting device 50. The strong brightness to the weak brightness is in order of the first light area A1', the second light area A2' and the third light area A3'. It can generate the softening effect and the vignetting effect of the light-emitting device 50' by this structural design, so as to comfort the user's eyes.

In contrast to the prior art, the present invention provides the light-emitting device with vignetting effect. The light derived from the light source can be divided into the parallel direct light, the oblique light and the scattering light by the first light guiding tunnel and the second light guiding tunnel formed in the light guiding structure, so as to generate the vignetting effect. Furthermore, it can reduce the brightness of the light emitting outside the light-emitting device to comfort the user's eyes by the opaque layer of the decoration plate. In addition, it can design that the diameter of the guiding hole is less than the diameter of the second opening of the second light guiding tunnel or additionally dispose the translucent layer to shade the contour of the light source. Therefore, the present invention improves a disadvantage of high cost and a poor yield rate because it has to shade the light source by means of the light guiding column, painting or plating shading material in the prior art. In addition, the present invention provides a freedom to design the light-emitting device with a beautiful appearance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light-emitting device, comprising:
   a light source for emitting light;
   a panel comprising a first surface and a second surface opposite to the first surface, the light source being close to the second surface; and
   a light guiding structure disposed inside the panel for guiding the light emitted from the light source for generating a vignette effect, the light guiding structure comprising:
   a first light guiding tunnel, a first end and a second end being formed on the first light guiding tunnel, a first opening being formed at the first end, and the first opening being on the second surface and close to the light source; and
   a second light guiding tunnel, a first end and a second end being formed on the second light guiding tunnel, the first end of the second light guiding tunnel being communicated with the second end of the first light guiding tunnel, a diameter of the second end of the second light guiding tunnel being greater than a diameter of the first end of the second light guiding tunnel, a second opening being formed at the second end of the second light guiding tunnel, the second opening being on the first surface of the panel, and a diameter of the second opening being greater than a diameter of the first opening;
   wherein the light from the light source passes through the first opening, the first light guiding tunnel, the second light guiding tunnel and the second opening to emit outside the second opening in sequence, so that at least one first light area is formed by parallel direct light derived from the light and located on a central position of the second opening on the first surface of the panel, and other light areas are formed by non-parallel direct light derived from the light and surround the first light area.

2. The light-emitting device of claim 1, wherein the other light areas surrounding the first light area comprises a second light area mainly formed by oblique light derived from the light source.

3. The light-emitting device of claim 2, wherein the other light areas surrounding the second light area comprises a third light area mainly formed by scattering light derived from the light source.

4. The light-emitting device of claim 1, wherein the light source is a circular light source, and a diameter of the first end of the first light guiding tunnel is substantially equal to a diameter of the second end of the first light guiding tunnel.

5. The light-emitting device of claim 1, wherein the diameter of the first opening is substantially equal to an outer diameter of the light source.

6. The light-emitting device of claim 1, further comprising a decoration plate disposed on the first surface of the panel, and the decoration plate being selectively for shading the light source as the light source does not emit the light or for allowing light derived from the light source passing through.

7. The light-emitting device of claim 6, wherein the decoration plate comprises an opaque layer disposed on a side facing the first surface of the panel, and the opaque layer is for blocking the light derived from the light source.

8. The light-emitting device of claim 7, wherein the decoration plate further comprises a transparent layer disposed on the other side away from the first surface of the panel.

9. The light-emitting device of claim 8, wherein the transparent layer of the decoration plate comprises a polished surface.

10. The light-emitting device of claim 8, wherein the decoration plate further comprises a mesh layer disposed between the opaque layer and the transparent layer.

11. The light-emitting device of claim 10, wherein a guiding hole corresponding to the second opening is formed on the opaque layer and the mesh layer, and a diameter of the guiding hole is not greater than the diameter of the second opening.

12. The light-emitting device of claim 11, wherein the decoration plate further comprises a translucent layer disposed inside the guiding hole corresponding to the mesh layer, and the translucent layer is for blocking the light derived from the light source partially, so as to generate a nebulization effect.

13. The light-emitting device of claim 1, wherein the light source is a light-emitting diode.

14. The light-emitting device of claim 1, further comprising a circuit board whereon the light source is disposed, and the circuit board is close to the second surface of the panel.

15. The light-emitting device of claim 14, further comprising a touch sensing component disposed on the circuit board and close to the light source.

* * * * *